(12) United States Patent
Saal et al.

(10) Patent No.: US 12,558,976 B2
(45) Date of Patent: Feb. 24, 2026

(54) SYSTEM FOR PROVIDING ELECTRIC VEHICLES

(71) Applicant: ONgineer GmbH, Espelkamp (DE)

(72) Inventors: Per-Simon Saal, Bielefeld (DE); Andre Müller, Rahden (DE); Peter Bredemeier, Preußisch Oldendorf (DE); Claus-Martin Mündel, Rahden (DE); Stefan Honerkamp, Bad Essen (DE)

(73) Assignee: ONgineer GmbH, Espelkamp (DE)

( * ) Notice: Subject to any disclaimer, the term of this patent is extended or adjusted under 35 U.S.C. 154(b) by 695 days.

(21) Appl. No.: 17/917,203

(22) PCT Filed: Mar. 23, 2021

(86) PCT No.: PCT/EP2021/057421
§ 371 (c)(1),
(2) Date: Oct. 7, 2022

(87) PCT Pub. No.: WO2021/204530
PCT Pub. Date: Oct. 14, 2021

(65) Prior Publication Data
US 2023/0241986 A1 Aug. 3, 2023

(30) Foreign Application Priority Data
Apr. 6, 2020 (DE) ..................... 10 2020 109 573.2

(51) Int. Cl.
*H02J 7/00* (2006.01)
*B60L 53/12* (2019.01)
(Continued)

(52) U.S. Cl.
CPC .............. *B60L 53/12* (2019.02); *B60L 53/38* (2019.02); *B60L 53/55* (2019.02); *B60L 53/665* (2019.02);
(Continued)

(58) Field of Classification Search
CPC .......... B60L 53/12; B60L 53/38; B60L 53/55; B60L 53/68; B60L 53/665; B60L 2200/12; B60L 2250/20
(Continued)

(56) References Cited

U.S. PATENT DOCUMENTS 10,498,160 B2 12/2019 Desai et al.
2007/0250444 A1 10/2007 Yui et al.
(Continued)

FOREIGN PATENT DOCUMENTS

EP 0 741 441 A2 11/1996
WO 2008/157443 A2 12/2008
(Continued)

OTHER PUBLICATIONS

European Patent Office, International Search Report for PCT App. No. PCT/EP2021/057421, Sep. 28, 2021, pp. 1-6.
(Continued)

*Primary Examiner* — Alexis B Pacheco
(74) *Attorney, Agent, or Firm* — Cahn & Samuels, LLP

(57) ABSTRACT

The invention relates to a system for charging and for holding a battery-powered vehicle (20, 30). The system comprises an adapter (4) for being mounted on the vehicle (20, 30), in particular for being mounted on a cylindrical handlebar (21, 31) of a two-wheeled vehicle, the adapter (4) comprising a charging apparatus (41) that corresponds to the charging device (11) and has a receiver coil, wherein, when the fastening device is open, the receiving region extends between its longitudinal ends in the longitudinal direction X over at least 3 cm, and the transmission coil has a cross-sectional area of at least 15 cm², wherein the fastening device, when closed, sets the mobility of the holding portion to a holding tolerance range which is set in its transverse extension and in its longitudinal extension, wherein the (Continued)

Figure 1A:
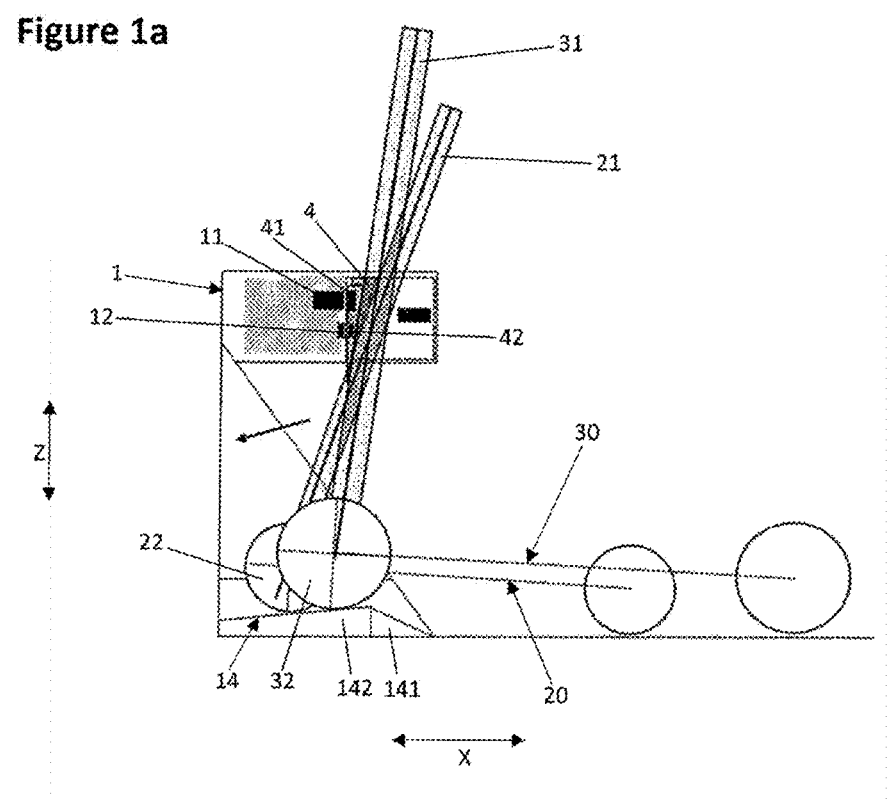

charging device (11) and the charging apparatus (41) can be correspondingly designed in such a way that, when the charging apparatus (41) is situated relative to the charging device (11) within a position tolerance range, this allows electrical energy to be transmitted from the charging device (11) to the charging apparatus (41) with an efficiency of more than 80%.

24 Claims, 3 Drawing Sheets

(51) Int. Cl.

| | |
|---|---|
| *B60L 53/38* | (2019.01) |
| *B60L 53/55* | (2019.01) |
| *B60L 53/66* | (2019.01) |
| *B60L 53/68* | (2019.01) |
| *B62H 3/02* | (2006.01) |
| *H02J 7/14* | (2006.01) |
| *B62H 3/00* | (2006.01) |

(52) U.S. Cl.
  CPC ................ *B60L 53/68* (2019.02); *B62H 3/02* (2013.01); *B60L 2200/12* (2013.01); *B60L 2250/20* (2013.01); *B62H 2003/005* (2013.01)

(58) Field of Classification Search
  USPC ......................................................... 320/134
  See application file for complete search history.

(56) References Cited

U.S. PATENT DOCUMENTS

| | | | | |
|---|---|---|---|---|
| 2009/0301976 | A1* | 12/2009 | Ayotte | ..................... B62H 3/00 |
| | | | | 211/5 |
| 2010/0308768 | A1* | 12/2010 | Dower | ................. H02J 7/0045 |
| | | | | 320/109 |
| 2011/0068738 | A1* | 3/2011 | Gomi | ................... B62K 11/007 |
| | | | | 320/108 |
| 2016/0176304 | A1* | 6/2016 | Sun | ........................ B60R 25/093 |
| | | | | 320/108 |
| 2017/0036722 | A1* | 2/2017 | Assénat | ................... B62H 3/00 |
| 2017/0040831 | A1* | 2/2017 | Desai | ...................... H02J 50/12 |
| 2017/0116805 | A1* | 4/2017 | Neupert | ................. B60L 53/31 |
| 2017/0364995 | A1 | 12/2017 | Yan | |
| 2018/0069416 | A1* | 3/2018 | Brace | ........................ F03D 9/00 |
| 2019/0263281 | A1* | 8/2019 | Wang | ...................... B60L 53/60 |
| 2020/0013112 | A1 | 1/2020 | Cho et al. | |
| 2020/0031247 | A1* | 1/2020 | Moravick | ............. B60L 3/0046 |
| 2021/0107579 | A1* | 4/2021 | Adam | ..................... B60L 50/20 |
| 2021/0170893 | A1* | 6/2021 | Moravick | .............. B60L 53/31 |
| 2021/0237599 | A1* | 8/2021 | Müller-Winterberg | ...................... B60L 53/67 |

FOREIGN PATENT DOCUMENTS

| | | | |
|---|---|---|---|
| WO | 2014/068125 | A2 | 5/2014 |
| WO | 2020/004509 | A1 | 1/2020 |

OTHER PUBLICATIONS

European Patent Office, Written Opinion for PCT App. No. PCT/EP2021/057421, Sep. 28, 2021, pp. 1-21.

European Patent Office, International Preliminary Report on Patentability with Annex for PCT App. No. PCT/EP2021/057421, Jun. 3, 2022, pp. 1-111.

Rui, Zhu et al., "Understanding spatio-temporal heterogeneity of bike-sharing and scooter-sharing mobility," Computer Environment and Urban System, Mar. 27, 2020 , pp. 1-13, vol. 81, issue 101483, https://dx.doi.org/10.1016/j.compenvurbsys.2020.101483.

European Patent Office, Communication pursuant to Article 94 (3) EPC for 21 716 070.4, Jun. 13, 2024, pp. 1-11.

\* cited by examiner

1st step

2nd step

3rd step

4th step

5th step

6th step

7th step

SYSTEM FOR PROVIDING ELECTRIC VEHICLES

The invention relates to a system for charging and holding a battery-powered vehicle, and to a method for operating such a system, and to the use of such a system for providing a vehicle for use by a user.

Systems of this type are increasingly required and used in public areas, in particular in large cities. In such systems of this type, use is usually made of several vehicles, in particular two-wheeled vehicles, which in each case have a battery and an electric drive powered by the battery. For example, use is made here of e-scooters and/or e-bikes, i.e., electrically driven scooters and/or electrically driven bicycles, generally speaking battery-powered two-wheeled vehicles with an electric drive. However, systems are also known in which other battery-powered vehicles can be used, for example electric cars. Such systems are typically used to enable a user to spontaneously use a battery-powered vehicle, for which they pay a usage fee depending on the course of their journey, for example dependent on time, dependent on energy consumption or dependent on distance covered. Systems are already known in which a user can, in particular in a cloud-based manner, create a user account assigned to them and can authenticate themselves as a user by way of their user account, for example at the vehicle itself or at a station to which the vehicle is connected. The authentication can be effected in a manner that is usual in the state of the art, for example by manual input of a pin at a user interface which is provided on the vehicle or at the station to which the vehicle is connected or by authentication by means of wireless transmission of a code. For example, it is known that the operator of such a system provides programs which can be installed on a smartphone, wherein communication between the smartphone and the vehicle or station can be effected by means of standard wireless interfaces, for example by means of NFC, Bluetooth, QR code scan, etc.

Systems of this type generally have the problem that, firstly, the batteries of the battery-powered vehicles must be regularly recharged and that, secondly, a sufficient number of battery-powered vehicles must always be available at particular hotspots from which a particularly large number of users usually start a journey with a battery-powered vehicle. In general, therefore, it is a challenge to charge the battery-powered vehicles sufficiently often and ensure a desired regional distribution of the battery-powered vehicles in order that they are available, ready for operation, at the required locations. There is also the requirement to protect such vehicles as far as possible against theft and misuse. Furthermore, specifically in public areas, it is desired for competition reasons, and thus in particular for the purposes of reducing the costs for the users and avoiding severe service outages resulting from insolvency, to allow a large number of different operators of battery-powered vehicles to operate.

In the state of the art, various approaches are known for implementing such systems of this type with the described requirements. For example, systems are known in which two-wheeled vehicles are used without regionally set stations to and at which these vehicles can be connected and can be charged being provided. This is usual in particular in the case of the provision of e-scooters. In such systems, the vehicles are located using GPS location, and the vehicles transmit their state of charge via radio signals. Such systems necessitate the use of mobile charging personnel. Such mobile charging personnel can, for example, directly carry a mobile charging station with them in order to charge the vehicles at the respective location at which they are situated, wherein, depending on demand and regional distribution, these mobile charging personnel can additionally bring the vehicles to predefined locations in order to ensure an expedient regional distribution of the vehicles. Another known possibility is for the mobile charging personnel first to bring the vehicles to a fixed charging station for charging, and then to distribute the vehicles. Such systems have the major advantage that the vehicles can be used by a user without any training in regionally set stations, with the result that such systems enable a very good mobility of a user and very easy handling. However, such systems have the disadvantage that, firstly, the vehicles are in no way protected against theft and misuse and that, secondly, the necessary use of mobile charging personnel gives rise to high personnel costs and, because of the imperative use of vehicles by the mobile charging personnel, emissions and thus negative environmental influences must be accepted. In the state of the art, systems are also known in which fixed stations are provided, wherein, after every use of the vehicle, the vehicle is to be brought to such a fixed station and locked up there, with the result that a journey with the vehicle can only ever start at one of the stations and end at one of the stations. Such systems have the major advantage that, if a charging function is provided at the stations, the batteries of the vehicles can always be sufficiently charged and also that, by virtue of the stations being set up at specified locations, the distribution of the vehicles can be directly set, and misuse and theft can furthermore be prevented. However, such systems have the major disadvantage that the dependence on the fixed stations restricts the flexibility when the vehicle is used by a user and furthermore that, if different operators are to be used in one regional area, it is necessary either for all of the operators to agree on the properties of the stations to be set up or else for different stations to be set up by different operators, which is expensive on the one hand but on the other hand is also risky, because both withdrawal and new entry of an operator are made more difficult. Furthermore, in the case of such systems operation by a user is complicated, because a user must become familiar with and adhere to the locking and charging requirements in order that the vehicle is parked at the stations in each case such that the vehicles can be charged at the stations. This is because, for charging, either wired charging is necessary, which requires a certain level of technical understanding by the user in order that the charging process is correctly initiated, or else a very precise arrangement of the vehicle relative to the station is necessary in order that, in the case of inductive charging, a sufficient transfer of energy from the station to the vehicle can be effected. In the case of a lack of energy transmission owing to a vehicle being incorrectly connected, downtimes because of uncharged batteries result.

The objects of the present invention are to provide a system and a station of a system and a method for operating a system and a use of a system with which at least one disadvantage of systems, stations, methods or uses of this type can be at least partially eliminated.

To achieve at least one of the above-described objects, the invention proposes a system for charging and for holding a battery-powered vehicle with the features of claim 1. The system is suitable for charging and holding a vehicle, which is designed in particular as a two-wheeled vehicle, in particular as an e-scooter or e-bike, which has an electric drive to which energy is supplied by a battery of the vehicle. The system comprises at least one station which has a holder for receiving a holding portion of the vehicle. The holding portion is thus a portion provided on the vehicle. It is possible in principle to form the holder such that the holder is formed to receive differently formed holding portions. For example, the holder can be designed to receive a cylindrical, cuboidal or bone-shaped holding portion, wherein the requirement on the holding portion is merely that the hold- ing portion has a certain minimum size, for example a size of at least 3 cm in a first spatial dimension, at least 3 cm in a second spatial dimension perpendicular to the first, and at least 1 cm in a third dimension perpendicular to the two first-named dimensions. For example, the holding portion can be delimited in that its lengths in at least two dimensions are set, for example to at most 2 cm in a third dimension and at most 5 cm in the first dimension. The system is indepen- dent of the specific design of the holding portion, because the station has, in principle, a holder with the properties described below, which is designed to receive a holding portion of any configuration designed corresponding to the holder with the features described below. The station fur- thermore has an electronic component which comprises an inductive charging device with a transmitter coil, wherein the position of the transmitter coil relative to the holder of the station is set. The holder and the charging device are thus set in terms of their spatial positions relative to one another. The station is particularly preferably designed such that the set spatial position of the charging device relative to the holder is not alterable. The holder has a fixing device. The fixing device can adopt at least two different states, namely a closed state and an open state. In the closed state the fixing device is designed to prevent the holding portion from being removed from the holder. In the open state the fixing device is designed to release the holding portion. The holder has a receiving region. At its two transverse ends delimiting it in a transverse direction, the receiving region is delimited by transverse side walls and, at a first longitudinal end delim- iting it in a longitudinal direction running perpendicular to the transverse direction, the receiving region is delimited by a longitudinal side wall and is open at its second longitudinal end opposite the first, with the result that it is made possible for the holding portion to be pushed into the receiving region along the longitudinal direction starting from the second longitudinal end. The holder of the station of the system according to the invention is thus in any case defined in that it has a receiving region which is delimited in the transverse direction at its two ends by transverse side walls and is delimited in the longitudinal direction at one longitudinal end by a longitudinal side wall, wherein the holding portion can be inserted into the receiving region starting from the second longitudinal end toward the first longitudinal end, and the fixing device in its open state makes it possible to remove the holding portion from the second longitudinal end of the receiving region and in its closed state prevents the holding portion from being able to be removed from the receiving region at the second longitudinal end. An extremely wide variety of embodiments are possible, via which a corresponding holder can be implemented, to which a corresponding holding portion of the vehicle is assigned in each case. For example, it is possible to form the holder U-shaped, wherein the fixing device is designed as a closure device at the open end of the U, wherein when the fixing device is in the open state the open end of the U is not closed, with the result that the holding portion can be removed at the second longitudinal end of the receiving region, whereas in the closed state the fixing device blocks the open end of the U, with the result that the holding portion cannot be removed from the receiving region at the second longitudinal end thereof. For example, it is possible to design the holding portion plate-shaped, wherein the receiving region is designed to receive a plate portion of the holding portion and wherein the holding portion has a recess, through which in the closed state a holding bolt formed by the fixing device extends, wherein during a transition from the closed state to the open state this holding bolt is retracted in the fixing device, with the result that it no longer extends into the cutout of the holding portion, with the result that the holding portion can be removed from the receiving region at the second longitudinal end. For example, it is possible to design the holding portion and the receiving region as a tongue and groove, in particular with detent connections, the mutual engagement of which can be reversibly released in order to be able to reversibly change between the closed state and the open state, wherein in the open state the holding portion can be pushed into the receiving region starting from the second longitudinal end and can be removed from the receiving region at the second longitudinal end. The holding portion and the receiving portion are in each case formed continuous or as comprising several mutually spaced-apart portions, and interact, wherein, if several mutually spaced- apart portions are provided, these are preferably in each case rigidly connected to one another, forming the holding por- tion or the receiving region respectively. In general, the receiving region or the fixing device with the receiving region is designed such that when the fixing device is in the open state a corresponding holding portion can be pushed into the receiving region starting from the second longitu- dinal end by pushing it in the longitudinal direction toward the first longitudinal end of the receiving region, in particu- lar by moving it exclusively in the longitudinal direction, and can be removed from the receiving region by pushing it out of the receiving region at the second longitudinal end of the receiving region in the longitudinal direction away from the first longitudinal end, in particular by moving it exclu- sively in the longitudinal direction, wherein in the closed state such a removal or pushing-out is prevented by the fixing device.

The discussed system according to the invention further- more has an adapter for mounting on the vehicle. In par- ticularly preferred embodiments, the vehicle is a two- wheeled vehicle, wherein the adapter is designed for mounting on a cylindrical handlebar of the two-wheeled vehicle and thus has a receptacle for the cylindrical handle- bar, in which the cylindrical handlebar can be attached and with which, in an operating position, it encloses the cylin- drical handlebar, in particular encloses it in a friction- locking and/or positive-locking manner, in order to ensure that the adapter is fixed to the handlebar in a positionally fixed manner. In this particularly preferred embodiment, the adapter therefore projects beyond the cylindrical handlebar in at least one direction, particularly preferably at the side of the handlebar which points forward in relation to the direc- tion of travel of the two-wheeled vehicle. In one embodi- ment, the adapter is fastened to the vehicle releasably, in particular releasable only by means of a wrench that is not available commercially. In one embodiment, the adapter is non-releasably connected to the vehicle. In one embodiment, the adapter is integrated in the vehicle as a part thereof. In one embodiment, the adapter has an exit opening for elec- tromagnetic radiation, through which the electronic compo- nents of the adapter can transmit signals into the surround- ings around the vehicle, preferably to the station or the corresponding electronic component of the station. In gen- eral, the exit opening is preferably covered by a plastic cover. The adapter can be integrated in a handlebar of a vehicle, wherein, self-evidently, the handlebar then prefer- ably has said exit opening. The adapter has a charging apparatus, corresponding to the charging device, with a receiver coil. The receiving region extends between its longitudinal ends in the longitudinal direction over at least 3 cm, and the transmitter coil has a cross-sectional area of at least 8 cm², in particular at least 10 cm², in particular at least 15 cm². The transmitter coil can comprise several coil elements which in each case have a coil axis about which their coil windings run, wherein the coil elements can together form said cross-sectional area. The fixing device is preferably configured such that in the closed state it sets a mobility of the holding portion to a holding tolerance range, which is set in terms of its transverse extent and its longitudinal extent, by providing boundaries of the receiving region at its two transverse ends and at its first longitudinal end and by providing a boundary at the second longitudinal end of the receiving region and/or by providing a force introduction device which exerts a force on the holding portion toward the first longitudinal end in the longitudinal direction, wherein the charging device and the charging apparatus are configured corresponding to one another in such a way that, in the case of an arrangement of the charging apparatus relative to the charging device within a position tolerance range, a transmission of electrical energy from the charging device to the charging apparatus is made possible with an efficiency of over 75%, in particular over 80%, in particular over 85%, in particular over 90%, wherein the position tolerance range has at least the same transverse extent and the same longitudinal extent as the holding tolerance range. Because, at least when the fixing device is in the open state, the receiving region extends between its longitudinal ends in the longitudinal direction over at least 3 cm, and the transmitter coil has a cross-sectional area of at least 8 cm², it is ensured that the receiving region is configured to receive a large number of differently designed holding portions, whereas the transmitter coil, owing to its sufficiently large cross-sectional area, ensures a sufficiently good coupling between the transmitter coil and the receiver coil over a considerable tolerance range of the arrangement of the receiver coil relative to the transmitter coil. The cross-sectional area of the transmitter coil relates here to the area of the cross section of the transmitter coil perpendicular to its coil axis about which the windings of the coil run circumferentially. If the transmitter coil includes several coil elements, the cross-sectional area refers to the sum total of the cross-sectional areas of the coil elements which in each case run perpendicular to the respective coil axis of the respective coil element. In general, when the fixing device is in the closed state the transmitter coil and the receiver coil are preferably forced into such an alignment relative to one another in which their coil axes have an angle of less than 20°, in particular less than 10°, with respect to one another. In general, it may be pointed out that, if the transmitter coil is designed as comprising several coil elements, the alignment of all of the coil elements forming said cross-sectional area of the transmitter coil corresponds to the alignment of the receiver coil, wherein the receiver coil can correspondingly also have several coil elements, which are then aligned corresponding in each case to the coil elements of the transmitter coil, with the result that in each case at least one of the coil elements of the receiver coil is aligned with respect to the coil elements of the transmitter coil which form said cross-sectional area. Correspondingly, where statements are made regarding ratios between the number of windings of the transmitter coil and the number of windings of the receiver coil, if at least one of the coils is formed by several coil elements, reference is made to the respectively associated windings of receiver coil and transmitter coil by which the transformation ratio between the two coils is defined. In general, it may be pointed out at this juncture that the positionally fixed arrangement of the adapter on the vehicle sets the relative position of adapter and holding portion with respect to one another. In one embodiment, the holding portion is formed at least in portions, in particular entirely, by the adapter. Because the fixing device is configured, in the closed state, to set a mobility of the holding portion to a holding tolerance range by providing boundaries of the receiving region at its two transverse ends and at its first longitudinal end and by providing a boundary at the second longitudinal end of the receiving region and/or by providing a force introduction device which exerts a force on the holding portion toward the first longitudinal end in the longitudinal direction, and because the charging device and the charging apparatus are designed corresponding to one another in such a way that they make it possible to transmit energy from the transmitter coil to the receiver coil with a very high efficiency when the charging apparatus is arranged relative to the charging device within a position tolerance range which has at least the same extents as the holding tolerance range at least in the transverse direction and the longitudinal direction, it is reliably ensured that an efficient charging of the battery of the two-wheeled vehicle is made possible when the two-wheeled vehicle is held, via its holding portion, in a positionally fixed manner on the station when the fixing device is in the closed state. Self-evidently, it is provided here that the adapter is connected in an electrically conductive manner to the battery of the electric two-wheeled vehicle in order that the battery can be charged via the adapter and thus via the electrical energy received from the charging apparatus. In the vehicle, the electrical outputs of the charging apparatus therefore feed the battery of the vehicle, and are therefore connected to the charge inputs of the battery. In general, the system preferably comprises at least one vehicle which has the adapter and the holding portion. The fixing device can be designed in various ways to limit the mobility of the holding portion in the receiving region in the closed state. For example, in the transverse side walls and the longitudinal side wall, the fixing device can have mechanically movable wall regions which can be moved out of the respective side wall to the center of the receiving region, whereas at the second longitudinal end of the receiving region the fixing device in the closed state provides a fixed boundary wall, which delimits the receiving region in the longitudinal direction in the closed state. It may be pointed out here that, in some embodiments, the holding portion extends only in portions in the receiving region, with the result that in the closed state the portion of the holding portion arranged in the receiving region is correspondingly limited in terms of its mobility in the receiving region, whereby the holding portion itself is self-evidently limited in terms of its mobility. For example, the fixing device can be designed in such a way that the holder has a U-shaped receptacle, wherein the fixing device has a movable means which is arranged at the open end of the U in the closed state and moves toward the closed end of the U, wherein this movable element can in particular have a circular-arc portion pointing toward the closed end of the U, with the result that when the fixing device is in the closed state a mobility of a holding portion of any design which is arranged in the receiving region is limited by the fixing device because the fixing device ensures boundaries of the receiving region both at its transverse ends and at its two longitudinal ends. The force introduction device, which can be provided as an alternative or in addition to the provision of a boundary at the second longitudinal end of the receiving region by the fixing device, is configured to exert a force on the holding portion toward the first longitudinal end in the longitudinal direction, thus in a direction which points from the second longitudinal end to the first longitudinal end of the receiving region. A wide variety of possibilities for ensuring such a force introduction device are known to a person skilled in the art. For example, the force introduction device can be provided at the boundary which delimits the receiving region at its second longitudinal end. For example, the force introduction device can act outside the holding portion, for example on the adapter which is mounted on the vehicle. For example, the force introduction device can be ensured as a mechanical spring element or as an electromechanical component, for example by a bolt that is electrically movable in the longitudinal direction. For example, the force introduction device can act on the vehicle at another location, in particular by acting on the wheel of the vehicle, in particular by utilizing a downward gradient. Here, the force introduction device indirectly or directly exerts a force on the holding portion toward the first longitudinal end in the longitudinal direction at all times. The mobility of the holding portion in the receiving region is thus preferably limited by the action of the force. The limitation of the mobility to the holding tolerance range can self-evidently be overcome, in the embodiment, in that a force that opposes the force applied by the force introduction device is exerted on the vehicle or the holding portion. The force introduction device is preferably designed such that it, indirectly or directly, exerts a force on the holding portion in the longitudinal direction toward the first longitudinal end of the receiving region which is at least 5 N, in particular at least 10 N, and which must be overcome, thus the restriction of the mobility of the holding portion in the receiving region must be overcome in order to move the holding portion out of the holding tolerance range. Self-evidently, the fact that the fixing device in the closed state prevents the holding portion from being removed at the second longitudinal end of the receiving region can be provided independently of or additionally to the provision of the force introduction device. There are various possibilities for providing a transmission efficiency of over 75%, in particular over 80%, in particular over 90%, within a position tolerance range between two coils during an inductive charging operation. For this purpose, the operating frequency of the transmitter coil is to be set depending on the inductance of the coils and the capacitances of the capacitors provided in the electrical circuits of the transmitter and receiver coils. The inventors have recognized that, for the system according to the invention, it is relevant that the inductive charging is optimized not for a predetermined very short spacing between the receiver coil and the transmitter coil, as is otherwise usual, but instead, owing to the adaptive concept on which the system according to the invention is based, a position tolerance range must specifically be provided, within which a transmission of energy from the transmitter coil to the receiver coil with high efficiency can be ensured. It has been found to be particularly advantageous to set the inductances of the transmitter and receiver coils, the capacitances of the electrical circuits of the charging apparatus and charging device, and the operating frequency such that a transmission of energy is made possible with an efficiency of over 75%, in particular over 80%, in particular over 85%, when the coil axes are aligned flush and parallel with a spacing range of from 1 mm to 2 cm in the direction of their coil axes. The inventors have thus recognized that what is particularly advantageous for the system according to the invention is not the optimization of an absolute efficiency in the case of a particular spacing between the transmitter coil and the receiver coil, but specifically the provision of a position tolerance range, within which a continuously very high transmission efficiency is ensured.

The system according to the invention thus provides significant advantages. Through the provision of an adapter which can be mounted on a vehicle in a positionally fixed manner, the system can be used for different vehicles, which can differ in particular in terms of their designs. For example, through the system according to the invention it can thus be made possible to provide, with the system according to the invention, a large number of vehicles from different operators for use in one public area. For example, the adapter can be provided to be mounted in a positionally fixed manner on a cylindrical handlebar of an e-scooter, wherein the handlebar simultaneously provides the holding portion of the vehicle, with the result that e-scooters from different operators, which differ in particular in terms of the angle of inclination of their handlebars and the diameter of their handlebars and which differ in terms of the charging technology of their batteries, can be operated using the system according to the invention, because the fixing device is designed, in the closed state and whilst receiving a holding portion of the cylindrical handlebar of different e-scooters, to always set the mobility of the holding portion to a holding tolerance range, and because a transmission of energy can be ensured within the position tolerance range owing to the coordination of the transmitter coil of the station and the receiver coil of the adapter, wherein the fixing device acts such that the receiver coil is in the position tolerance range relative to the transmitter coil when the holding portion of the cylindrical handlebar of any e-scooter is held in the holder when the fixing device is in the closed state.

In one embodiment, the fixing device has a channel for receiving at least one wheel of the vehicle, which runs in the longitudinal direction and, at least in a downward gradient portion which has in particular a longitudinal extent of at least 10 cm, in particular at least 15 cm, in particular at least 20 cm, has a downward gradient which runs vertically from top to bottom with a downward gradient direction running in the longitudinal direction. The downward gradient is preferably at least 3%, in particular at least 5%. In the downward gradient portion, the side pointing upward in the intended operating position of the channel thus runs vertically from top to bottom in the downward gradient direction, i.e., the vertical height of the top side of the channel becomes smaller in the downward gradient direction. The downward gradient direction runs in the direction from the first longitudinal end to the second longitudinal end of the receiving region. The channel particularly preferably has an upward gradient portion which is arranged before the downward gradient portion in the downward gradient direction, with the result that, in a progression along the downward gradient direction, the upward gradient portion is provided first and then subsequent to the upward gradient portion the downward gradient portion is provided. In the upward gradient portion, the channel runs vertically from bottom to top along the downward gradient direction, i.e. the top side, which points upward in the intended operating position, of the channel has, in the upward gradient portion, a height which increases along the downward gradient direction in the upward gradient portion. Through the provision of the downward gradient portion, the downward gradient direction of which runs in the longitudinal direction and the downward gradient direction of which runs in the direction from the second longitudinal end toward the first longitudinal end of the receiving region and thus toward the longitudinal side wall in the longitudinal direction, it is particularly easily ensured that the fixing device, in the closed state, limits the mobility of the holding portion to a predefined holding tolerance range, and in particular sets the arrangement of the holding portion. This is because, through the provision of the downward gradient portion, the fixing device forces the wheel of the vehicle to move in the longitudinal direction toward the first longitudinal end of the receiving region. Correspondingly, the channel is designed as a force introduction device which exerts a force on the holding portion in the longitudinal direction toward the first longitudinal end of the receiving region. The channel can thus form the force introduction device of the system or of the station, or at least a part of the force introduction device. The fixing device is particularly preferably in the closed state when the wheel is situated in the channel of the fixing device. The provision of the upward gradient portion makes it possible to design the fixing device in a targeted manner such that, through the upward gradient portion and subsequent downward gradient portion, it is made easily possible for a user to connect the vehicle to the station tactilely. Furthermore, the provision of the upward gradient portion and the downward gradient portion following it in the downward gradient direction makes it easily possible to design the station as an apparatus which in itself has a sufficient downward gradient in the downward gradient portion.

In one embodiment, the channel has a cross section perpendicular to the longitudinal direction in the manner of a V, the limbs of which extend vertically upward and outward from a central base region. The center of the V shape is therefore a center perpendicular to the longitudinal direction, in particular a center in relation to the transverse direction, and the limbs of the V extend outward away from this center, wherein in the course of their extent they extend vertically upward and outward from the center. In embodiments, the V shape can self-evidently be formed as in the transverse direction and thus without a slope or in particular also convex in the central base region, in particular over an extent of at least 4 cm, in particular at least 6 cm, in the transverse direction, because the central base region serves merely for the purposes of supporting the wheel for easy movability of the wheel on the channel, wherein the limbs extend vertically upward and outward starting from the transverse end, respectively associated with them, of the central base region and serve for the purposes of guiding the wheel laterally. The limbs particularly preferably form an angle with respect to one another which decreases at least in longitudinal portions along the downward gradient direction, with the result that the V shape becomes increasingly narrower along the downward gradient direction. Reference is preferably made here to the averaged progression of the limbs from the base region to their respective upper end. The design of the channel with a cross section perpendicular to the longitudinal direction in the manner of a V has the particular advantage that the wheel of the vehicle is forced into a predefined position perpendicularly with respect to the longitudinal direction by the channel. Through the combination of the downward gradient, which forces the wheel into a predefined position along the longitudinal direction, and the design of the cross section in the manner of a V, the position of the wheel of the vehicle, and thus the position of the holding portion in the receiving region, can thus be predefined in a particularly effective manner. In the particularly preferred embodiment in which the angle formed between the limbs decreases at least in longitudinal portions along the downward gradient direction, it is made possible that a vehicle can first be easily introduced into the channel along the longitudinal direction by a user, and then the channel undertakes the guidance of the wheel into a targeted end position. The limbs particularly preferably have at their upper end a maximum spacing, based on a maximum along the longitudinal direction, which is at least 7 cm. The limbs preferably converge obliquely in longitudinal portions, and thus over a longitudinal portion, in an uninterrupted manner at least until they have a spacing of less than 7 cm, self-evidently likewise with regard to their upper ends. A particularly targeted guidance of the wheel of the vehicle for the particularly targeted positioning of the holding portion can hereby be made possible.

In one embodiment, the receiving region is open at its vertical ends by which it is delimited in a vertical direction running perpendicular to the transverse direction and perpendicular to the longitudinal direction, wherein the receiving region is configured to receive a handlebar, which runs along the vertical direction, of the vehicle. Here, the handlebar can run at an angle with respect to the vertical direction, but can in any case extend outward from the receiving region at the upper and lower vertical ends of the receiving region. This can make it possible to particularly easily fix a vehicle, in particular a two-wheeled vehicle with its handlebar, to the holder, and furthermore to particularly easily set the mobility of the holding portion, which is formed by the handlebar, in the receiving region by means of the fixing device. Here, the handlebar is the bar of the vehicle which extends above the front wheel and in which the steering mechanism is configured to steer the front wheel, wherein the handlebar is preferably formed as a steering tube. The receiving region particularly preferably has a cross section perpendicular to the vertical direction in the manner of a U, wherein the U has its base at a first longitudinal end and is open at a second longitudinal end. Here, the first and second longitudinal ends are longitudinal ends of the receiving region when the fixing device is in the open state. The fixing device furthermore has a closing element which, in the closed state, closes the open longitudinal end of the U. The closing element can be formed as a single-part or multi-part. The closing element thus forms a boundary of the receiving region at its second longitudinal end in the closed state and thereby limits the mobility of the holding portion between the base of the U of the receiving region and the closing element in the longitudinal direction. The closing element is particularly preferably supported movably along the longitudinal direction and configured to move in the longitudinal direction toward the base of the U in the case of a transition of the fixing device from the open state into the closed state. For example, the fixing element can comprise a component in the manner of a rotary disk, in particular eccentric rotary disk, which has an opening and which, to implement the closed state, rotates about an axis of rotation starting from the open state, wherein the opening of the fixing device, and thus at least one portion of the fixing device, moves toward the base of the U in the longitudinal direction during the rotation. The fixing device can for example also comprise a bolt, in particular a bolt shaped in the manner of a segment of a circular arc, which is pivoted starting from the open state until it closes the open end of the U, and is in particular subsequently moved further in the longitudinal direction to the base of the U, wherein, in particular, a guide of the bolt running in the longitudinal direction can be provided on the transverse side walls which delimit the receiving region. The fixing device particularly preferably has a spring device which subjects the closing element to a spring force acting on the closing element in the longitudinal direction toward the base of the U. The spring device thus acts such that the closing element performs the described movement in the longitudinal direction toward the base of the U. For example, the fixing device can comprise a closing mechanism, in particular an electronic or electromechanical closing mechanism, implemented for example by an electromagnet, which when the fixing device is in the open state loads the closing element with a force which opposes the spring force of the spring device which the latter exerts on the closing element, wherein for the transition from the open state into the closed state of the fixing device the force of the closing mechanism is withdrawn, for example by electrical switching of the closing mechanism, with the result that the spring device can act with its spring force on the closing element in order to implement the closed state.

In one embodiment, the holder is designed to receive, as a holding portion in the receiving region, a handlebar portion of any handlebar which has any diameter between 3 cm and 6 cm and has any angle between at least 75° and 85°, in particular between 70° and 87°, in particular between 65° and 90°, with respect to the longitudinal direction, wherein the fixing device of the holder is designed to adopt the closed and the open state, and reversibly switch between these states, in the case of a handlebar portion received as holding portion in the receiving region. The receiving region therefore has such a dimensioning that any handlebar, in particular cylindrical handlebar, which in its holding portion has a diameter in the discussed range and a progression with respect to the longitudinal direction in the discussed angle range can be arranged in the receiving region, and, when the holding portion is arranged in the receiving region, the fixing device can switch reversibly between the open and closed states. This can be ensured for example by designing the receiving region with a sufficient spacing between its transverse side walls and a sufficient longitudinal extent between its two longitudinal ends, wherein, to limit the mobility of the holding portion, the fixing device can have a corresponding mobility, in particular a corresponding mobility along the longitudinal direction, as discussed above. In particular, for this purpose, it can be provided that the fixing device has a spring device which subjects a closing element of the fixing device to a spring force which seeks to cause a movement of the closing element from the second longitudinal end of the receiving region, by which it is delimited in the open state, toward the center of the receiving region, in particular a movement of the closing element, starting from the open state, from the second longitudinal end toward the first longitudinal end of the receiving region.

The fixing device is particularly preferably electronically actuatable, with the result that changing between the open and closed states of the fixing device is possible via an electronic switching, and the fixing device can thus change between its open state and its closed state in an electronically controlled manner. The fixing device is particularly preferably designed to automatically adopt the closed state when it is detected that a portion of the holding portion of the vehicle is received in the receiving region, and adopt the open state starting from the closed state only in response to an electronic opening command. The detection can be effected for example by communication between communication apparatus and communication device, or by mechanical automatism, e.g. a mechanically initiated snapping-in action. Through the electronic switching of the fixing device, in particular through the automatic detection that the portion of the holding portion of the vehicle is received in the receiving region and the correspondingly automatically and electronically controlled adoption of the closed state, it is made particularly reliably possible for a vehicle to be held by the fixing device in a desired parked state at the station, in which the battery of the vehicle can be charged via the adapter and the charging device of the station. Through the design of the fixing device in such a way that it adopts the open state starting from the closed state only in response to an electronic opening command, prevention of theft and misuse can be ensured, and an imposition, dependent on usage in a targeted manner, of a usage fee for the vehicle can hereby be made possible.

In one embodiment, the station has, as a further electronic component, a wireless communication device which is configured corresponding to a wireless communication apparatus formed by the adapter, in order to make an exchange of data between adapter and station possible. The electronic component of the station therefore preferably comprises the charging device and the communication device. The communication device and the communication apparatus can be designed in a manner familiar to a person skilled in the art, for example, as NFC communication devices, Bluetooth communication devices or as an RFID chip and associated reader device of the station or reader apparatus of the adapter. The communication device and the communication apparatus are particularly preferably configured to ensure a bidirectional communication, in particular via NFC or Bluetooth communication. The provision of the corresponding communication device and communication apparatus can be particularly advantageous for a communication exchange between the vehicle and the station, in particular in order to ensure a detection of the vehicle by the station or a detection of the station by the vehicle. It can hereby be ensured, for example, that only such vehicles which are correspondingly registered, and for which a corresponding usage fee can therefore be imposed, can be connected to the station and charged by the station. In general, the fixing device is particularly preferably configured to adopt the closed state after detection of an authentication of the adapter by means of the communication apparatus thereof. The authentication can, for example, comprise a transmission of a code or the reading of a code, wherein an information item relating to the respective code is stored in a memory device assigned to the station.

In general, the transmitter coil of the station is preferably spaced apart by less than 1 cm, in particular less than 5 mm, in particular less than 3 mm, in particular is not spaced apart, from at least one boundary of the receiving region, wherein reference is made to a boundary which is directly adjacent to and delimits the receiving region and thus the space formed by the receiving region, in which the holding portion of the vehicle can be arranged. It can hereby be particularly reliably ensured that energy is transmitted with high efficiency between the charging device and the charging apparatus, and the transmitter coil, in particular the electronic component of the station, can be easily robustly protected by corresponding integration in the holder. This is because the position of the receiving region relative to the holding portion of the vehicle is very precisely predefined when the fixing device is in the closed state, and the holder must in any case have a robustness required for the holding action. It is correspondingly made possible to provide the electronic component, in particular charging apparatus and/or communication apparatus, on the vehicle in the immediate vicinity of the holding portion, with the result that an exchange of data between the communication device and the communication apparatus and an exchange of energy between the charging device and the charging apparatus can be ensured.

In general, the communication device and the communication apparatus, and the charging device and the charging apparatus, are preferably configured here corresponding to one another in such a way that an exchange of data between the communication device and the communication apparatus can be effected within a spacing range between the communication device and the communication apparatus the maximum value of which is greater than the maximum value of the spacing range between the charging device and the charging apparatus, within which they must be arranged in order that electrical energy can be transmitted between the charging apparatus and the charging device with an efficiency of more than 70%, in particular more than 80%. In general, the station preferably comprises a processing unit and a memory, via which an activation of the charging device and/or the communication device is effected when the station is in an operational state. In general, the station is preferably configured to ascertain, via its charging device, a spacing to a corresponding charging apparatus, for example by ascertaining, through energy pulses emitted into the transmitter coil, the feedback with a corresponding receiver coil of a corresponding charging apparatus. In general, the station is particularly preferably configured to output energy via its transmitter coil for a period of time of more than 5 minutes only if the station has previously established, via its processing unit, that a corresponding charging apparatus with a corresponding receiver coil is situated within a predetermined spacing range with respect to the transmitter coil, in particular within a predetermined spacing range with a predetermined alignment, wherein this establishment can be effected for example via said energy pulses in the transmitter coil or via reading of information from the communication apparatus by the communication device.

In general, a winding ratio between the transmitter coil of the charging device and the receiver coil of the charging apparatus is preferably provided which has a value of at least 1:1, in particular at least 1.5:1, in particular at least 2:1, in particular between 1.5:1 and 5:1. A step-down transformation of the operating voltage which is supplied to the transmitter coil with respect to the operating voltage which is output by the receiver coil can hereby be effected. Furthermore, it can hereby be ensured that a high voltage can be supplied to the transmitter coil, which is advantageous for the transmission of energy, in particular with regard to the required currents which flow through the transmitter coil, and with regard to the spacing between receiver coil and transmitter coil within which energy can still be transmitted from the transmitter coil to the receiver coil with high efficiency. The charging device is particularly preferably configured to apply an operating voltage of over 200 V, in particular over 300 V, in particular of at least 400 V, to the transmitter coil to perform the transmission of the electrical energy, wherein the charging apparatus is configured to output a charging voltage of less than 60 V during this transmission of the electrical energy. The receiver coil is particularly preferably configured to output a voltage of less than 100 V during this transmission. An efficient transmission of energy can hereby be ensured and at the same time it can be ensured that only an electrical voltage in a range that is not hazardous to a person is generated in the vehicle.

The transmitter coil particularly preferably has a cross-sectional area, i.e. the area of its cross section perpendicular to its coil axis, which is at least as large as a cross-sectional area of the receiver coil, in particular is larger than a cross-sectional area of the receiver coil, i.e. the area of the cross section of the receiver coil perpendicular to its coil axis, wherein the cross-sectional area of the transmitter coil is preferably at least 1.5 times the cross-sectional area of the receiver coil. In general, the transmitter coil and the receiver coil are preferably designed in the manner of a cylinder, in particular a circular cylinder. The inventors have recognized that, by providing a larger cross-sectional area of the transmitter coil compared with the receiver coil, the position tolerance range within which energy can be transmitted from the transmitter coil to the receiver coil with high efficiency can have a particularly advantageous size. The transmitter coil and the receiver coil particularly preferably in each case have a cross-sectional area of more than 8 $cm^2$, in particular more than 10 $cm^2$, in particular more than 15 $cm^2$.

The charging device is particularly preferably configured to operate the transmitter coil, for the transmission of electrical energy, at an operating frequency which is adapted to transmit the electrical energy with an efficiency of at least 90% in the case of a parallel alignment, spaced apart with a spacing of 1.5 cm, of the transmitter and receiver coils, in which coil centers of the two coils are aligned flush with one another. In this preferred embodiment, the charging device is therefore configured in a targeted manner such that electrical energy can be transmitted to the transmitter coil of the corresponding charging apparatus with high efficiency if the coil axes of the receiver coil and the transmitter coil are aligned flush with one another and parallel to one another, wherein the coil axes in each case run through the coil centers of the coils, and wherein the transmitter and receiver coils are spaced apart from one another with a spacing of 1.5 cm along the direction predefined by their coil axes. It is familiar to a person skilled in the art to adapt the corresponding electrical circuits of the charging apparatus and the charging device to one another. In general, in the charging device a first capacitor is preferably connected in series with respect to the transmitter coil and in the charging apparatus a second capacitor is connected in series with respect to the receiver coil. This can be particularly advantageous for the selection of an operating frequency for operating the transmitter coil in order to ensure an energy transmission with high efficiency in a large spacing range. Particularly preferably, the first capacitor has a first capacitance and the second capacitor has a second capacitance, wherein the first capacitance is greater than the second capacitance. The first capacitance is particularly preferably at least 1.5 times the second capacitance. A particularly good coupling and efficient transmission of energy from the transmitter coil to the receiver coil in the case of a large spacing, in particular a spacing of over 1 cm, between the transmitter and receiver coils can hereby be ensured. In general, the first capacitance C1 is preferably at least 1.5 times, in particular at least 2 times, the value which is obtained by multiplying the second capacitance C2 by the square of the ratio of the number of windings N2 of the receiver coil to the number of windings N1 of the transmitter coil: $C1 \geq 1.5*(N2:N1)^2*C2$, in particular $C1 \geq 2*(N2:N1)^2*C2$. In general, the charging device and the charging apparatus are preferably configured to ensure a transmission of energy from the receiver coil to the transmitter coil with an efficiency of at least 90%, in which the energy is transmitted with a transmission power of at least 40 W, in particular at least 60 W, in particular at least 100 W, in particular at said spacing or in said spacing range.

In general, the system preferably comprises the vehicle, wherein the adapter is mounted on the vehicle. The system particularly preferably comprises different vehicles, on which in each case the adapter is mounted, wherein the vehicles differ at least in terms of their geometrical design, wherein, when the respective vehicle is in a parked state in which the holding portion of the respective vehicle is situated in the receiving region of the station and the fixing device is in its closed state, the adapter is fixed to the respective vehicle in a positionally fixed manner in such a way that it has a spacing of less than 2 cm, in particular less than 1 cm, to the transmitter coil of the charging device of the station. The vehicle is particularly preferably a two-wheeled vehicle, wherein the adapter is mounted on the handlebar of the vehicle. In general, the at least one vehicle, in particular all vehicles of the system, preferably comprises a control device and an operating device, wherein the control device in an operating state of readiness for use is configured to activate the electric drive depending on an actuation of the operating device in order to drive the vehicle and in a locked operating state is configured to prevent the vehicle from being driven by means of the electronic drive by actuation of the operating device. In the operating state of readiness for use the control device thus makes it possible to drive the vehicle as a result of a user imparting a drive command to the control device via the operating device, wherein the control device converts this drive command into an electric activation of the electric drive in order to drive the vehicle. By contrast, in the locked operating state, in the case of a corresponding actuation of the operating device via which a drive command is imparted to the control device, the control device does not activate the electric drive in order to drive the vehicle, with the result that a user cannot use the electric drive to drive the vehicle by actuation of the operating device. Particularly preferably, the control device is configured to detect, independently of the state of the fixing device, an authentication of a user via a communication apparatus comprised by the adapter while it is in the locked operating state, and to adopt the operating state of readiness for use in response to the detection of the authentication without influencing the state and independently of the state of the fixing device. Here, the control device is preferably configured, in the adopted operating state of readiness for use, to activate the electric drive during a journey until it adopts the locked operating state again. The invention self-evidently also comprises embodiments in which the control device can also influence the fixing device depending on the authentication of a user. In the described embodiment, however, the control device is in any case configured, in the locked operating state even independently of the state of a fixing device of a station of the system, to detect an authentication of a user and, independently of the fixing device and thus without influencing a state of the fixing device, to adopt the operating state of readiness for use, in which it can then activate the electric drive during a journey. The described embodiment has the particular advantage that a vehicle can change between the locked operating state and the state of readiness for use even when it is not being held on a station while the fixing device of the station adopts its closed state. This can make a use of the vehicle by a user possible independently of the station. The control device is particularly preferably configured, after the journey, to communicate via its communication apparatus with a communication device of the station by means of an exchange of data while the fixing device is in its closed state, wherein the system has a controller which is configured to read the exchange of data and to make an entry in a user account of the authenticated user depending on the exchange of data. In this particularly preferred embodiment, it is thus firstly possible for a vehicle to be used by a user independently of whether it is connected to a station, wherein, up until the start of the use, it is protected against misuse by the locked operating state, whereas the system can detect, via the controller, that after a use, which started independently of a station, the vehicle has been connected to a station, while the fixing device is in its closed state, with the result that an entry can be effected in a user account of the authenticated user depending on this detection. The exchange of data can for example comprise the transmission of the journey start and journey end values, discussed below, and/or of other usage information items, such as for example deposit debit and deposit credit information items, and/or parameters characterizing these. Here, the journey start and journey end values can in general preferably be dependent on location, dependent on time and/or dependent on a battery state of charge, in order that, on the basis of these values, a usage-dependent debiting of a user account can be effected, for example in a manner dependent on the distance traveled (by way of values dependent on location), on the duration of the journey made (by way of values dependent on time) or on the energy consumed during the journey (by way of values dependent on a battery state of charge). The communication device and the communication apparatus can self-evidently have features which are described elsewhere in conjunction with possible designs of the communication device and the communication apparatus.

The invention furthermore relates to a station for charging and for holding a battery-powered vehicle, in particular a station of a system according to the invention. The station comprises a holder for receiving a holding portion of the vehicle and an inductive charging device the position of which relative to the holder in the station is set. The holder comprises a fixing device which in a closed state is configured to prevent the holding portion from being removed from the holder and which in an open state is configured to release the holding portion, wherein the holder has a receiving region which, at its two transverse ends delimiting it in a transverse direction, is delimited by transverse side walls and, at a first longitudinal end delimiting it in a longitudinal direction running perpendicular to the transverse direction, is delimited by a longitudinal side wall and is open at its second longitudinal end opposite the first in order to make it possible to push the holding portion into the receiving region starting from the second longitudinal end. In various embodiments, the station can have features which are discussed with regard to the station of various embodiments of a system according to the invention. In general, the vertical direction is perpendicular to the transverse direction and to the longitudinal direction, in particular also with regard to the above-discussed embodiments of a system according to the invention. The receiving region preferably extends between its longitudinal ends in the longitudinal direction over at least 3 cm, in particular at least 5 cm. The charging device preferably has a transmitter coil with a cross-sectional area of at least 8 cm$^2$, in particular at least 10 cm$^2$, in particular at least 15 cm$^2$. The fixing device is particularly preferably configured, in the closed state, to set the mobility of the holding portion to a holding tolerance range, which is set in terms of its transverse extent and its longitudinal extent, in particular by providing boundaries of the receiving region at its two transverse ends and at its first longitudinal end, and by providing a boundary at its second longitudinal end and/or by providing a force introduction device which, in the closed state, exerts a force on the holding portion toward the first longitudinal end of the receiving region in the longitudinal direction, wherein the charging device is configured to make it possible to transmit electrical energy to a corresponding charging apparatus within a position tolerance range which has at least the same transverse extent and the same longitudinal extent as the holding tolerance range.

In one embodiment, the station has a controller connected to a data memory. The controller is configured to store in the data memory user accounts which in each case have a user identification information item as first account parameter and a vehicle operator information item as second account parameter. In one embodiment, the controller is configured to activate the fixing device to adopt the closed state, and to output energy via the charging device, only if an authentication of a user with their user account correspondingly created in the data memory is detected. The controller is particularly preferably configured to activate the fixing device to adopt the closed state, and to output energy via the charging device, only if an authentication of a user with a user account created in the data memory in such a way that the second account parameter of this user account corresponds to a vehicle operator information item assigned to the station is detected. This has the particular advantage that, via the controller, the station is secured against unqualified use. This particularly preferred embodiment thus has the advantage that a clear parameterization of user accounts with regard to vehicle operator information can be effected via the controller, with the result that qualified vehicle operators can assign their corresponding identification to a corresponding user account. Firstly, this is for the purposes of safety, because only qualified vehicle operators are authorized to use the station. Secondly, this serves to prevent misuse of the station, for example by unauthorized charging. Furthermore, it is made possible for the operator of a station to assign rights to the use of the station in a targeted manner. In a particularly preferred embodiment, the controller is configured to store the number of authentications. Via this, an operator of the station can for example detect a need for maintenance of the station. In one embodiment, the controller is configured, in the case of every authentication, to store in the data memory a vehicle identification information item for the vehicle held at the station. This vehicle identification information item can for example be passed via the communication apparatus of the vehicle to the communication device of the station, and from there into the controller. The controller is particularly preferably configured to store in the data memory the number of authentications relating to each determined vehicle identification information item. Usage behavior relating to selected vehicles can hereby be analyzed and, for example, timely maintenance of the vehicle after sufficiently frequent use can be ensured, which can improve the safety and readiness for use of the vehicle.

The invention furthermore relates to a method for operating a system, in particular a system according to the invention, which comprises a battery-powered vehicle with an electric drive and several stations. In a first method step, the vehicle is held in a first parked state on a holder of a first station in a set position relative to the first station, wherein the vehicle is prevented from being released from the holder by a fixing device of the holder, and a battery of the vehicle is charged, in particular is inductively charged, while the vehicle is held in the first parked state relative to the first station. In a second method step, a first user to whom a first user account is assigned is detected through a first authentication, after which the vehicle is released by the fixing device of the first station. The user account is assigned to the user by virtue of a user account relating to the user having previously been created in a memory, and the user account in the memory having been assigned a first authentication, via which the user and therefore their user account assigned to them can be uniquely authenticated. Furthermore, after detection through the first authentication, the control device of the vehicle adopts an operating state of readiness for use, in which it is configured to activate the electric drive depending on an actuation of an operating device of the vehicle in order to drive the vehicle. Furthermore, after the first user has been detected through the first authentication, a deposit debit information item and a journey start value dependent on location and/or time and/or dependent on a battery state are assigned as usage information to the first user account, in particular before or at the latest when the control device activates the electric drive in order to drive the vehicle. In a third method step, a journey end signal is received. The journey end signal can for example be triggered by the control device of the vehicle itself after the control device has detected no actuation of the operating device over a predetermined time interval. The journey end signal can for example be received by the operating device. The journey end signal can be received for example via wireless communication, in particular via a communication apparatus of the vehicle, for example by coupling of the communication apparatus to a smartphone of the user. After the journey end signal has been received, the control device of the vehicle adopts a locked operating state, in which it is formed to prevent the vehicle from being driven by means of the electric drive by actuation of the operating device. Furthermore, after the journey end signal has been received, a first journey end value, which is preferably dependent on time, dependent on location and/or dependent on a battery state of charge, is assigned to the first user account. A debit information item is particularly preferably assigned to the first user account depending on the first journey start value and on the first journey end value. Like the deposit debit information item, the debit information item can for example be a debit information item of the first user account relating to an amount of money to be debited. Furthermore, after the first journey end signal has been received, it is checked whether the vehicle is in a second parked state, in which it is held on a holder of a second station in a set position relative to the second station and, in the process, the vehicle is prevented from being released from the holder of the second station by a fixing device of the holder of the second station, wherein the second parked state is preferably furthermore defined by the fact that energy is transmitted between the charging device of the second station and the charging apparatus of the vehicle. The first and second stations can be configured as discussed with regard to systems according to the invention or with regard to a station according to the invention in various embodiments, in particular designed identically. Furthermore, it is possible for the second station to be identical to the first station. The check as to whether the vehicle is in the second parked state can for example be effected as discussed above via the charging device and the charging apparatus, by estimating a spacing between the charging device and the charging apparatus. For example, the check can also be effected by virtue of a communication device of the station communicating with a communication apparatus of the vehicle, whereby the vehicle can authenticate itself at the station. In the third method step, a deposit return information item is assigned to the first user account only if it is established that the vehicle is in the second parked state. Otherwise, the deposit debit information item remains assigned to the first user account without a corresponding deposit return information item. In a fourth method step following the third method step, if it is established in the third method step that the vehicle is not in the second parked state, a second user to whom a second user account is assigned is detected through a second authentication, after which the control device of the vehicle is placed in the operating state of readiness for use, and a second journey start value dependent on location and/or time and/or dependent on a battery state of charge is assigned as usage information to the second user account. The second user account and the second authentication can be provided as discussed with regard to the first user account and the first authentication. In a fifth method step, which follows the fourth method step, a deposit credit is assigned to the second user account only if it is established that the vehicle is in a third parked state, in which it is held on a holder of a third station in a set position relative to the third station and, in the process, the vehicle is prevented from being released from the holder of the third station by a fixing device of the holder of the third station. This establishment can be effected as discussed above with regard to the second parked state, wherein the third parked state is preferably furthermore defined by the fact that energy is transmitted between the charging device of the third station and the charging apparatus of the vehicle. The third station can be configured as discussed above with regard to the first and second stations, in particular can have features of a station according to the invention or features of a station of a system according to the invention in the described embodiments. The third station can also be identical to the first station.

The method according to the invention makes a particularly efficient provision of battery-powered vehicles for use over a large area by different users possible. Firstly, the provision of stations with which the vehicles can be charged ensures that the batteries of the vehicles are charged sufficiently often, with the result that the vehicles are available for use, in an energy-efficient manner and at low cost. Secondly, through the provision of the operating state of readiness for use and the locked operating state, and the provision of the authentications, and the detection of the respective parked states, and the assignment of a deposit debit information item or deposit credit to user accounts, an incentive is provided to bring the vehicle to a station in order that it can be charged, without a user being strictly obligated to travel to such a station when they have ended their journey. This can enable a user, accepting the imposition of a permanent debit on their user account with the deposit debit information item, to use a vehicle without parking it in a predefined parked state at a station and leaving it to be charged there, whereas other users in turn have the option of benefiting from deposit credits by bringing a vehicle that has been parked away from a station to a station.

Particularly preferably, in the fourth method step, a group of setpoint stations is indicated as information to the second user. The indication can be effected for example via a display on the vehicle, or through the transmission of information from a communication apparatus of the vehicle to a mobile terminal of the user, for example to a smartphone. Then, in the fifth method step, the deposit credit is credited to the second user account only if the third station belongs to the group of setpoint stations. A desired distribution of vehicles can hereby be achieved through the assignment of stations to the group of setpoint stations. Particularly preferably, if it is established that the third station does not belong to the group of setpoint stations, a second journey end value is assigned to the second user account, wherein a debit information item is assigned to the second user account depending on the second journey start value and on the second journey end value. Correspondingly, a fee can be imposed on the second user account, which is dependent on the second journey start value and on the second journey end value. In a particularly preferred embodiment, it is provided that, if it is established in the fifth method step that the third station belongs to the group of setpoint stations and the deposit credit is credited to the second user account, no debit information item depending on the second journey start value and second journey end value is assigned to the second user account, with the result that the second user can, without paying a journey fee, ensure that the vehicle is brought to a station in the group of setpoint stations and, for this, additionally receives the deposit return information item as a credit on their second user account. This can create an incentive for the vehicles to be brought to setpoint stations predetermined according to a desired distribution, in particular an automatically ascertained desired distribution, and placed in a corresponding parked state there and charged there in order to be ready for use.

In one embodiment, in the fourth method step, after the second authentication has been detected, a second deposit debit information item is assigned to the second user account. This can have the particular advantage of an incentive for the second user to park the vehicle at a station. Particularly preferably, in the fifth method step, a second deposit credit assigned to the second deposit debit information item is assigned as a deposit credit to the second user account, with the result that, if it is established that the vehicle is in the third parked state, the second deposit credit is credited to the second user account. Particularly preferably, in the method according to the invention, if it is established that the third station belongs to the above-discussed group of setpoint stations, in addition to the second deposit credit, a first deposit credit, which is assigned to the deposit debit information item assigned to the first user account in the first method step, is also assigned to the second user account as a deposit credit. Thus, a single deposit credit, namely the second deposit credit assigned to the second deposit debit information item, is credited to the second user account if the third station is a station which is not included in the group of setpoint stations, whereas the first and second deposit credits are assigned to the second user account if the third station is a station in the group of setpoint stations. This provides a particular incentive for a user to bring a vehicle to a selected station, namely a station in the group of setpoint stations, in order to earn money, whereas, on the other hand, an incentive is also always provided for any other second user to park the vehicle in the third parked state at least at any station.

The invention furthermore relates to the use of several stations according to the invention and/or of a system according to the invention, which comprises several stations and which preferably comprises several vehicles, on which in each case an adapter is mounted in a positionally fixed manner, for providing at least one vehicle, in particular the several vehicles, for use by a user, during which they travel with the vehicle from a first of the stations to a second of the stations, and during which the vehicle is initially in a first parked state, in which it is held on the one holder of a first station in a set position relative to the first station and, in the process, the vehicle is prevented from being released from the holder by a fixing device of the holder and, in the process, a battery of the vehicle is charged, in particular inductively charged. The use preferably relates to the fact that, at the end of the use, the vehicle is in a second parked state, in which it is held on a holder of a second station in a set position relative to the second station and, in the process, the vehicle is prevented from being released from the holder by a fixing device of the holder of the second station and, in the process, a battery of the vehicle is charged. The stations and vehicles preferably in each case have features which are apparent from the above statements relating to various embodiments of the system according to the invention, of the station according to the invention and of the method according to the invention. In general, it may be pointed out at this juncture that the described embodiments according to the invention can in each case be combined with one another as desired. As discussed, the use can refer to the use of several stations according to the invention and/or to the use of a system according to the invention with several stations, in particular several stations according to the invention.

Particularly preferably, during the use, access to a data memory is established for the creation of user accounts. The user accounts are particularly preferably created in the data memory. The user accounts particularly preferably in each case have a user identification information item as first account parameter and a vehicle operator information item as second account parameter. The controller is preferably configured to allow the vehicle to be parked at one of the stations in a particular parked state, in which it is held on a holder of this station in a set position relative to this station and, in the process, the vehicle is prevented from being released from the holder by the fixing device of the holder of this station and, in the process, a battery of the vehicle is charged, only if an authentication of a user with such a created user account is detected. The controller is thus configured selectively, to the effect that it can make a selection and allows a vehicle to be parked in said particular parked state only if a user with a user account stored in the data memory has authenticated themselves. The authentication can be effected for example via the communication device and/or communication apparatus. As discussed with regard to the station according to the invention, the authentication can be evaluated by a controller of the station, which in the present case can be a controller of the overall system and thus a controller common to all stations. Particularly preferably, parking of the vehicle in the particular parked state at a particular one of the stations is allowed only if an authentication of such a user with such a user account the second account parameter of which corresponds to a vehicle operator information item assigned to the particular stations has been detected. In this particularly preferred embodiment, the use according to the invention therefore makes it possible that the vehicle can be parked in said parked state only after authentication of a user account to which a particular vehicle operator information item is assigned, whereby in particular misuse of a or the station(s) can be prevented and a targeted selection of vehicle operator can be made. The number of authentications effected at the respective stations is particularly preferably stored. Particularly preferably, in the case of every authentication, a vehicle identification information item for the vehicle held at the station is stored. Maintenance of the vehicle provided with this vehicle identification information item is particularly preferably performed depending on the ascertained number.

The invention will be discussed in more detail below on the basis of embodiment examples with reference to two figures.

Figure 2:
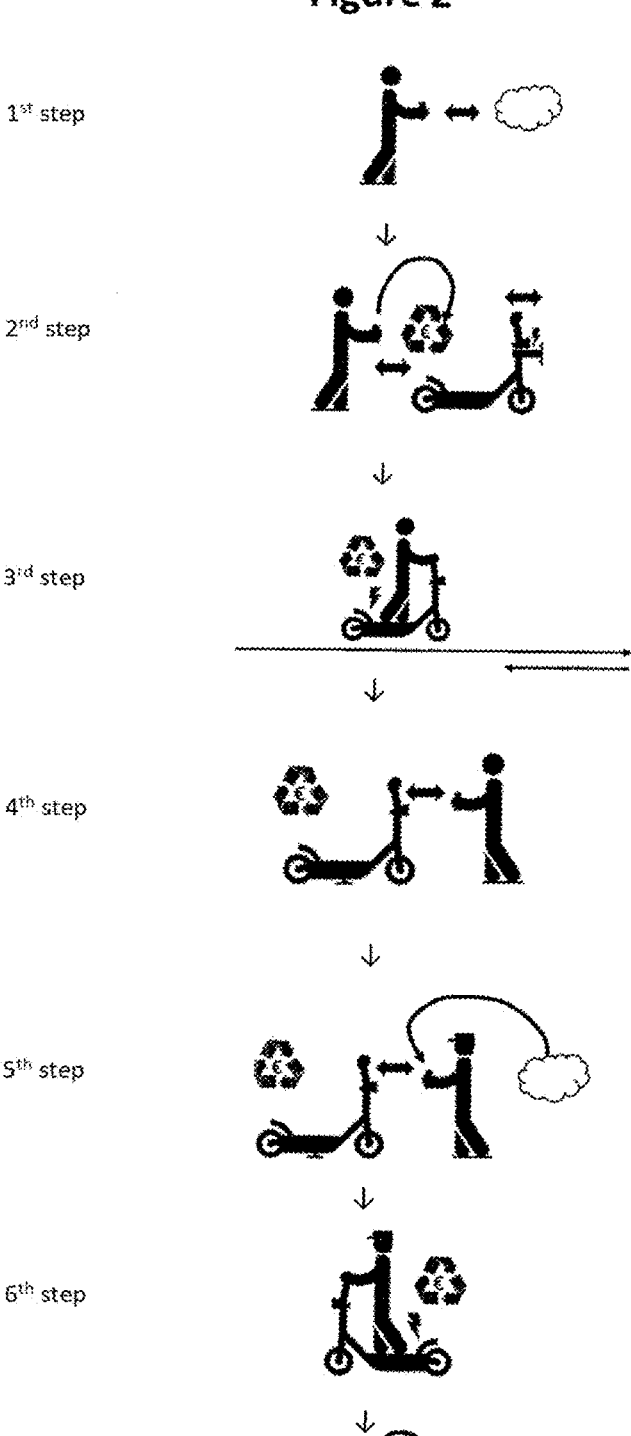

There are shown in:

FIG. 1: views of constituent parts of an embodiment of a system according to the invention in various schematic diagrammatic representations;

FIG. 2: a schematic explanation of an embodiment of a method according to the invention in a schematic representation.

Figure 1B:
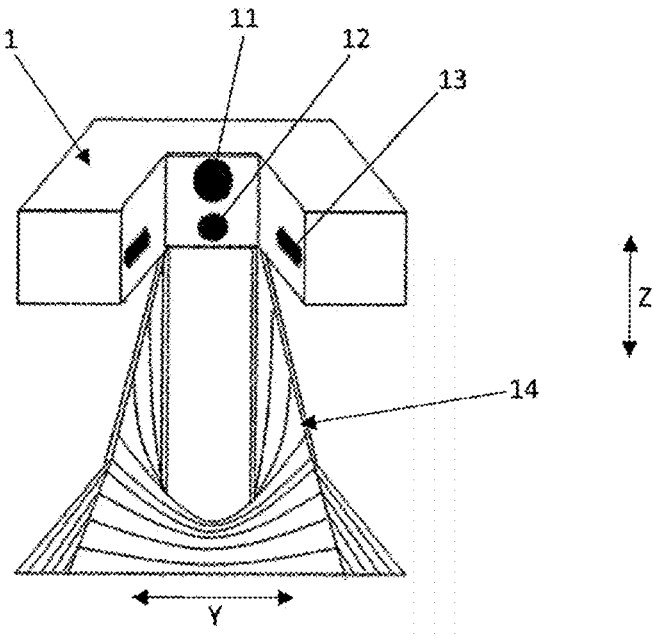
Figure 1C:
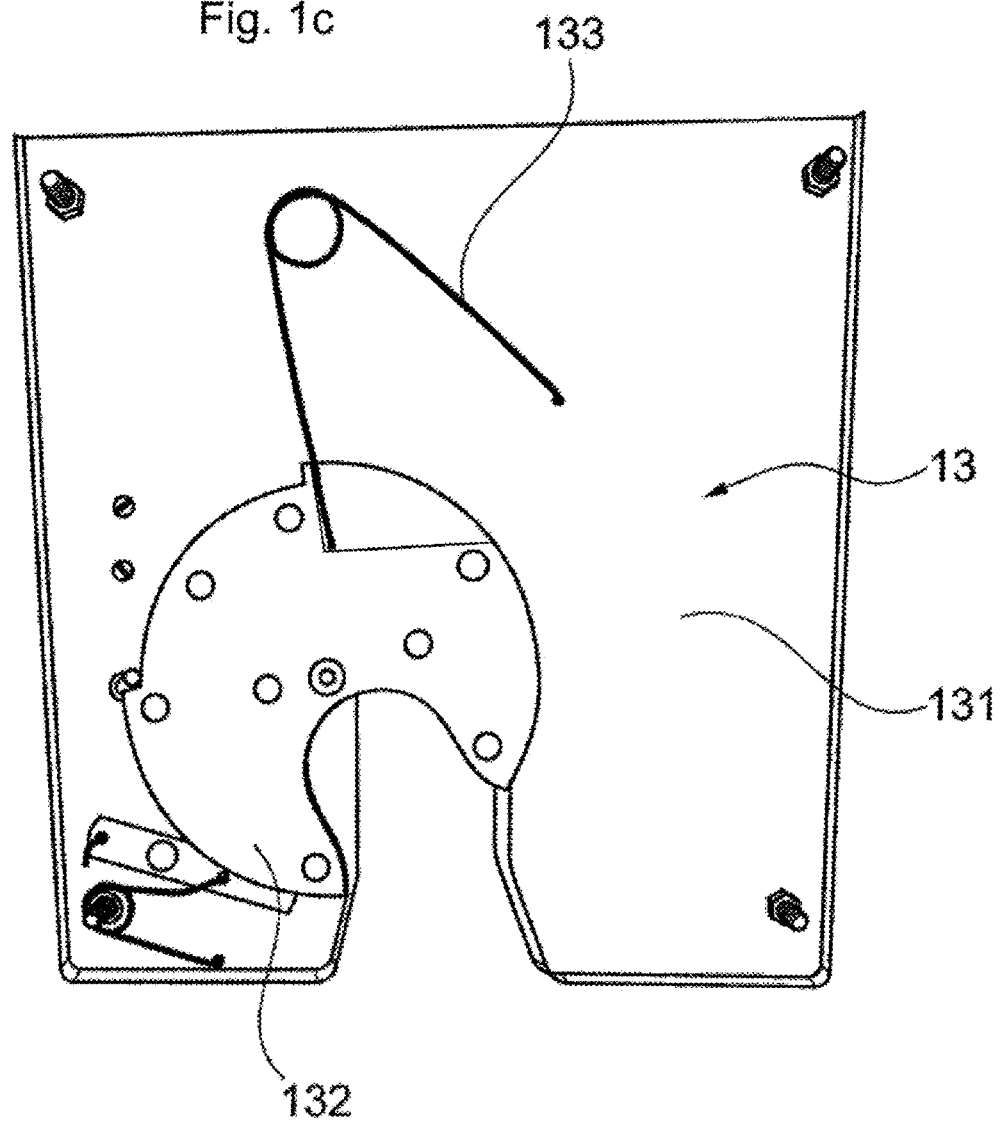

In FIG. 1, comprising FIGS. 1a, 1b and 1c, an embodiment of a system according to the invention is represented in a highly simplified manner in various schematic diagrammatic representations. In FIG. 1, a station with a holder 1 on which a vehicle 20, 30 is held is represented. Purely for illustrative purposes, the vehicles 20, 30 are represented overlapping. The vehicles 20, 30 are e-scooters, wherein the two vehicles 20, 30 are different. The vehicle 30 is larger than the vehicle 20. In particular, the wheels 32 of the vehicle 30 are larger than the wheels 22 of the vehicle 20, and the handlebar 31 of the vehicle 30 has a greater diameter and is longer than the handlebar 21 of the vehicle 20. Furthermore, the angle of inclination of the handlebar 31 of the vehicle 30 relative to the longitudinal direction X is greater than the angle of inclination of the handlebar 21 of the vehicle 20. FIG. 1a serves to illustrate that the holder is formed to hold the holding portions of both differently designed vehicles 20, 30 in accordance with the invention. The holding portions of the vehicles 20, 30 are in each case formed by a portion of their handlebars 21, 31, and by an adapter 4 fastened thereto.

A charging device 11 and a communication device 12 of the station are designed integrally in the holder 1, as can also be seen in particular in FIG. 1b. In each case one adapter 4, which has a charging apparatus 41 and a communication apparatus 42, is fixed to the handlebars 21, 31 of the vehicles 20, 30 in a positionally fixed manner. The holder 1 has a receiving region which has a cross section perpendicular to the vertical direction Z in the manner of a U, wherein the charging device 11 and the communication device 12 are adjacent to the base of the U of the receiving region. The limbs of the U shape form the transverse side walls of the receiving region. The base of the U-shape forms the longitudinal side wall at the first longitudinal end of the receiving region. The closing element 13 of the fixing device of the described embodiment is integrated in the limbs of the U shape of the receiving region. The closing element 13 is represented schematically in a highly simplified manner in FIG. 1c. The closing element 13 comprises a plate 131 with a cutout. A circular rotary disk 132, which is subjected to a spring force by a spring device 133, is rotatably fastened to the plate 131. The spring force of the spring device 133 seeks to cause the rotary disk 132 with its opening to rotate such that, when the holding portion formed by the handlebar 21, 31 and adapter 4 is situated in the receiving region of the holder 1, it exerts a force in the longitudinal direction X toward the first longitudinal end on a side of the handlebar 21, 31 facing away from the first longitudinal end of the receiving region. The fixing device furthermore has a channel 14, the design of which can be seen from FIGS. 1a and 1b. The channel 14 has a downward gradient portion 142 and an upward gradient portion 141. Furthermore, the channel 14 has a cross section perpendicular to the longitudinal direction X which has a shape in the manner of a V, the limbs of which extend vertically upward outward from a central base region. Here, the limbs are spaced apart from one another at their upper ends. The spacing of the limbs at their upper ends decreases along the downward gradient direction, with the result that they form an angle with respect to one another which decreases in the course of the downward gradient direction. The channel 14 ensures a guidance of the wheel 22, 32 in the transverse direction Y and in the longitudinal direction X toward the first longitudinal end of the receiving region, with the result that the channel 14, as part of the fixing device, contributes to the fact that, when the fixing device is in the closed state in which the circular disk 132 has been rotated such that it prevents the holding portion from being removed at the second longitudinal end of the receiving region opposite the first longitudinal end, the holding portion which is arranged in the receiving region is limited in terms of its mobility to a holding tolerance range both in the transverse direction Y and in the longitudinal direction X. The vertical position of the holding portion is in any case set by the vertical height at which the holding portion is provided on the handlebar 21, 31 of the vehicle 20, 30.

In FIG. 2, an embodiment of a method according to the invention is represented in a schematically illustrated manner. The method according to the invention is used to operate a system which comprises a battery-powered vehicle, which has an electric drive, and several stations. In the described embodiment of the method according to the invention, in a first step, a first user creates a first user account, which is stored in a controller of the system, wherein the controller can in particular access a data memory situated in the cloud. In a second step, a first authentication is detected by virtue of a first user authenticating themselves at the vehicle with their first user account, while the vehicle is in a first parked state on a holder of a first station in a set position relative to the first station and, in the process, is held non-releasably on the holder by the fixing device of the holder and, in the process, a battery of the vehicle is charged, in particular inductively charged. In the second step, a deposit debit information item and a journey start value dependent on location and/or time and/or dependent on a battery state of charge is assigned to the first user account. In the third step, the first user uses the vehicle to travel from the station to another location. In the fourth step, the user ends their journey and transmits a journey end signal to the vehicle, which is received by the vehicle. While, after the first authentication, the vehicle was in an operating state of readiness for use in which the user was able to activate the electric drive of the vehicle via an operating device of the vehicle, after receipt of the journey end signal the control device adopts a locked operating state, in which the vehicle can no longer be used as intended, i.e., in which the control device does not activate the electric drive of the vehicle even in the case of corresponding actuation of the operating device. In the fourth step, it is checked whether the vehicle is in a second parked state, in which it is held on a holder of a second station in a set position relative to the second station and, in the process, the vehicle is prevented from being released from the holder of the second station by a fixing device of the holder of the second station. It is established that this is not the case, because the first user has not parked the vehicle at a station. Correspondingly, a usage fee is firstly imposed on the first user account, which is ascertained depending on the journey start value and depending on a journey end value which, when the journey end signal is received, is ascertained depending on the location and/or on the time and/or the battery state of charge of the vehicle. In the fifth step, a second user who has previously created a second user account authenticates themselves at the vehicle, with the result that the vehicle detects a second authentication. After the second authentication has been detected, the control device of the vehicle is placed in the operating state of readiness for use. Furthermore, the vehicle indicates to the second user a group of setpoint stations, wherein the vehicle is ideally to be brought to one of the setpoint stations. The indication proceeds via the smartphone of the second user, with which the second user also authenticated themselves. In the sixth step, the second user uses the vehicle, which is in the operating state of readiness for use, and travels with this vehicle to a third station. In the seventh step, the second user, at the third station, pushes the vehicle into the holder of the third station until the vehicle is in a third parked state, in which it is held on the holder of the third station in a set position relative to the third station and, in the process, the vehicle is prevented from being released from the holder of the third station by a fixing device of the holder of the third station and, in the process, energy is transmitted between the charging device and the charging apparatus. At this moment, the control device automatically generates a second journey end signal. Although in the fifth step, with the second authentication, a second journey start signal was also generated and a second journey start value was assigned to the second user account, a usage-dependent fee is not imposed on the second user account, because the second user has brought the vehicle to one of the indicated setpoint stations. Instead, a deposit return information item is credited to the second user account, which in practice equates to a deposit credit on the second user account. Correspondingly, the described embodiment of the method according to the invention firstly makes a very straightforward use of the vehicle by the first user possible, for which the first user pays depending on their activity, whereas the method according to the invention provides a financial incentive for a second user with the aim that the second user will bring the vehicle to an expedient setpoint station at which there is demand for a vehicle and at which the vehicle, by being charged, is held ready for use. The method according to the invention, owing to its method sequence and the corresponding design of vehicles and stations, is thus configured to make a practical, cost-efficient and ecological provision of vehicles possible.

LIST OF REFERENCE NUMBERS

1 Holder
4 Adapter
11 Charging device
12 Communication device
13 Closing element
14 Channel
20 Vehicle
21 Handlebar
22 Wheel
30 Vehicle
31 Handlebar
32 Wheel
41 Charging apparatus
42 Communication apparatus
131 Plate
132 Rotary disk
133 Spring device
141 Upward gradient portion
142 Downward gradient portion
X Longitudinal direction
Y Transverse direction
Z Vertical direction

The invention claimed is:

1. A system for charging and for holding a battery-powered vehicle (20, 30), which has an electric drive, the system comprising a station which comprises:

a holder (1) for receiving a holding portion of the vehicle (20, 30) and an inductive charging device (11) with a transmitter coil the position of which relative to the holder (1) of the station is set, wherein the holder (1) has a fixing device which in a closed state is configured to prevent the holding portion from being removed from the holder (1) and which in an open state is configured to release the holding portion, and wherein the holder (1) has a receiving region which, at its two transverse ends delimiting it in the transverse direction (Y), is delimited by transverse side walls and, at a first longitudinal end delimiting it in the longitudinal direction (X) running perpendicular to the transverse direction (Y), is delimited by a longitudinal side wall and is open at its second longitudinal end opposite the first in order to make it possible to push the holding portion into the receiving region starting from the second longitudinal end, and an adapter (4) for mounting on the vehicle (20, 30), wherein the adapter (4) has a charging apparatus (41), corresponding to the charging device (11), with a receiver coil, wherein when the fixing device is in the open state the receiving region extends between its longitudinal ends in the longitudinal direction (X) over at least 3 cm, and the transmitter coil has a cross-sectional area of at least 8 cm$^2$, wherein the fixing device in the closed state sets a mobility of the holding portion to a holding tolerance range, which is set in terms of its transverse extent and its longitudinal extent, by providing boundaries of the receiving region at its two transverse ends and at its first longitudinal end and by providing a boundary at the second longitudinal end and/or by providing a force introduction device which exerts a force on the holding portion toward the first longitudinal end in the longitudinal direction (X), wherein the charging device (11) and the charging apparatus (41) are configured corresponding in such a way that, in the case of an arrangement of the charging apparatus (41) relative to the charging device (11) within a position tolerance range, a transmission of electrical energy from the charging device (11) to the charging apparatus (41) is made possible with an efficiency of over 75%, wherein the position tolerance range has at least the same transverse extent and the same longitudinal extent as the holding tolerance range.

2. The system according to claim 1, wherein the fixing device has a channel (14) for receiving at least one wheel (22, 32) of the vehicle (20, 30), which runs in the longitudinal direction (X) and, at least in a downward gradient portion (142) which has a longitudinal extent of at least 10 cm has a downward gradient which runs vertically from top to bottom with a downward gradient direction running in the longitudinal direction (X), wherein the downward gradient direction runs in the direction from the second longitudinal end to the first longitudinal end of the receiving region, wherein the downward gradient portion (142) follows on in the downward gradient direction from an upward gradient portion (141) preceding it, in which the channel (14) runs vertically from bottom to top along the downward gradient direction.

3. The system according to claim 2, wherein the channel (14) has a cross section perpendicular to the longitudinal direction (X) in the manner of a V, and limbs extending vertically upward and outward from a central base region, wherein the limbs form an angle with respect to one another which decreases at least in longitudinal portions along the downward gradient direction, wherein the limbs have at their upper end a maximum spacing, based on a maximum along the longitudinal direction (X), of at least 7 cm.

4. The system according to claim 1, wherein the receiving region is open at its vertical ends by which it is delimited in a vertical direction (Z) running perpendicular to the transverse direction (Y) and perpendicular to the longitudinal direction (X) in order to receive a handlebar (21, 31), running along the vertical direction (Z), of the vehicle (20, 30).

5. The system according to claim 4, wherein the receiving region has a cross section perpendicular to the vertical direction (Z) in the manner of a U, which is open at a second longitudinal end and has a base of the U at a first longitudinal end, wherein the fixing device has a closing element (13) which, in the closed state, closes the open longitudinal end of the U, wherein the closing element (13) is supported movably along the longitudinal direction (X) and is configured to move in the longitudinal direction (X) toward the base of the U in the case of a transition of the fixing device from the open state into the closed state, wherein the fixing device has a spring device (133) which subjects the closing element (13) to a spring force acting on the closing element (13) in the longitudinal direction (X) toward the base of the U.

6. The system according to claim 4, wherein the holder (1) is configured to receive, as a holding portion in the receiving region, a handlebar portion of any handlebar (21, 31) which has any diameter between 3 cm and 6 cm and has any angle between at least 75° and 85°, between 70° and 87°, between 65° and 90°, with respect to the longitudinal direction (X), wherein the fixing device of the holder (1) is configured to adopt the closed state and the open state, and reversibly switch between these states, when the handlebar portion is received as holding portion in the receiving region.

7. The system according to claim 1 wherein the fixing device is electronically actuatable, wherein the fixing device is configured to automatically adopt the closed state when it is detected that a portion of the holding portion of the vehicle (20, 30) is received, and to adopt the open state starting from the closed state only in response to an electronic opening command.

8. The system according to claim 1, wherein the station has a wireless communication device (12) which is configured corresponding to a wireless communication apparatus (42), formed by the adapter (4), in order to make an exchange of data between adapter (4) and the station possible, wherein the fixing device is configured to adopt the closed state after an authentication of the adapter (4) is detected by means of the communication apparatus (42) thereof.

9. The system according to claim 1, wherein the transmitter coil of the station is spaced apart from at least one boundary of the receiving region by less than 1 cm.

10. The system according to claim 1, wherein a winding ratio between the transmitter coil of the charging device and the receiver coil of the charging apparatus (41) of at least 1:1, at least 1.5:1, or between 1.5:1 and 5:1 is provided, wherein the charging device is configured to apply an operating voltage of over 200 V to the transmitter coil in order to perform the transmission of the electrical energy, wherein the charging apparatus (41) is configured to output a charging voltage of less than 60 V during this transmission of the electrical energy.

11. The system according to claim 1, wherein a cross-sectional area of the transmitter coil corresponds at least to a cross-sectional area of the receiver coil and is at least 1.5 times the cross-sectional area of the receiver coil.

12. The system according to claim 1, wherein the charging device (11) is configured, for the transmission of electrical energy, to operate the transmitter coil with an operating frequency which is adapted to transmit the electrical energy with an efficiency of at least 90% in the case of a parallel alignment, spaced apart with a spacing of 1.5 cm; of the transmitter and receiver coils, in which coil centers of the two coils are aligned flush with one another.

13. The system according to claim 1, wherein in the charging device (11) a first capacitor is connected in series with respect to the transmitter coil and in the charging apparatus (41) a second capacitor is connected in series with respect to the receiver coil, wherein the first capacitor has a first capacitance and the second capacitor has a second capacitance, and the first capacitance is greater than the second capacitance and/or is at least 1.5 times a product of the second capacitance and the square of the ratio of the number of windings of the receiver coil to the number of windings of the transmitter coil.

14. The system according to claim 1, further comprising the vehicle (20, 30), wherein the adapter (4) is mounted on the vehicle (20, 30).

15. The system according to claim 14, wherein the vehicle (20, 30) comprises a control device and an operating device, wherein the control device in an operating state of readiness for use is configured to activate the electric drive depending on an actuation of the operating device in order to drive the vehicle (20, 30) and in a locked operating state is configured to prevent the vehicle (20, 30) from being driven by means of the electric drive by actuation of the operating device, wherein the control device is configured to detect, independently of the state of the fixing device, an authentication of a user via a communication apparatus (42) comprised by the adapter (4) while it is in the locked operating state, and to adopt the operating state of readiness for use in response to the detection of the authentication without influencing the state and independently of the state of the fixing device, and then, in the operating state of readiness for use, to activate the electric drive during a journey.

16. The system according to claim 15, wherein the control device is configured, after the journey, to communicate via its communication apparatus (42) with a communication device (12) of the station by means of an exchange of data while the fixing device is in its closed state, wherein the system has a controller which is configured to read the exchange of data and to make an entry in a user account of the authenticated user depending on the exchange of data.

17. A station for charging and for holding a battery-powered vehicle (20, 30), the station comprising:

a holder (1) for receiving a holding portion of the vehicle (20, 30) and an inductive charging device (11) the position of which relative to the holder (1) in the station is set, and wherein the holder (1) has a fixing device which in a closed state is formed to prevent the holding portion from being removed from the holder (1) and which in an open state is formed to release the holding portion, and wherein the holder (1) has a receiving region which, at its two transverse ends delimiting it in a transverse direction (Y), is delimited by transverse side walls and, at a first longitudinal end delimiting it in a longitudinal direction (X) running perpendicular to the transverse direction (Y), is delimited by a longitudinal side wall and is open at its second longitudinal end opposite the first in order to make it possible to push the holding portion into the receiving region starting from the second longitudinal end, wherein the receiving region extends between its longitudinal ends in the longitudinal direction (X) over at least 3 cm, and the charging device (11) has a charging coil with a cross-sectional area of at least 8 cm², wherein the fixing device, in the closed state, sets the holding portion within the receiving region to a position within a holding tolerance range, which is set in terms of its transverse extent and its longitudinal extent, wherein the charging device (11) is formed to make it possible to transmit electrical energy to a corresponding charging apparatus (41) within a position tolerance range which has at least the same transverse extent and the same longitudinal extent as the holding tolerance range.

18. The station according to claim 17, further comprising a controller connected to a data memory, wherein the controller is configured to store in the data memory user accounts which in each case have a user identification information item as first account parameter and a vehicle operator information item as second account parameter, wherein the controller is configured to activate the fixing device to adopt the closed state, and to output energy via the charging device (11), only if an authentication of a user with their user account the second account parameter of which corresponds to a vehicle operator information item assigned to the station is detected, and/or is configured to retrievably store the number of authentications and/or, in the case of every authentication, to store in the data memory a vehicle identification information item for the vehicle (20, 30) held at the station.

19. A method for operating a system having a battery-powered vehicle (20, 30) with an electric drive and several stations, the method comprising:

in a first method step, the vehicle (20, 30) is held in a first parked state on a holder (1) of a first station in a set position relative to the first station and is prevented from being released from the holder (1) by a fixing device of the holder (1) and in which a battery of the vehicle (20, 30) is charged, in a second method step, a first user to whom a first user account is assigned is detected through a first authentication, and then the fixing device of the first station releases the vehicle (20, 30), a control device of the vehicle (20, 30) adopts an operating state of readiness for use, in which it is configured to activate the electric drive depending on an actuation of an operating device of the vehicle (20, 30) in order to drive the vehicle (20, 30), and a deposit debit information item and a first journey start value dependent on location and/or time and/or dependent on a battery state of charge are assigned as usage information to the first user account, in a third method step, a first journey end signal is received and, after the first journey end signal has been received, the control device of the vehicle (20, 30) adopts a locked operating state in which it is configured to prevent the vehicle (20, 30) from being driven by means of the electric drive by actuation of the operating device, and a first journey end value is assigned to the first user account, wherein it is checked whether the vehicle (20, 30) is in a second parked state, in which it is held on a holder (1) of a second station in a set position relative to the second station and is prevented from being released from the holder (1) of the second station by a fixing device of the holder (1) of the second station, and wherein a deposit return information item is assigned only if it is established that the vehicle (20, 30) is in the second parked state, in a fourth method step following the third method step, if it is established in the third method step that the vehicle (20, 30) is not in the second parked state, a second user to whom a second user account is assigned is detected through a second authentication, and then the control device of the vehicle (20, 30) is placed in the operating state of readiness for use, and a second journey start value dependent on location and/or time is assigned as usage information to the second user account, in a fifth method step, a deposit credit is assigned to the second user account only if it is established that the vehicle (20, 30) is in a third parked state, in which it is held on a holder (1) of a third station in a set position relative to the third station and, in the process, the vehicle (20, 30) is prevented from being released from the holder (1) of the third station by a fixing device of the holder (1) of the third station.

20. The method according to claim 19, wherein in the fourth method step, a group of setpoint stations is indicated as information to the second user, wherein; in the fifth method step, the deposit credit is credited to the second user account only if the third station belongs to the group of setpoint stations, wherein if it is established that the third station does not belong to the group of setpoint stations, a second journey end value is assigned to the second user account, and a debit information item is assigned in a manner dependent on the second journey start value and on the second journey end value.

21. The method according to claim 19, wherein in the fourth method step, after the second authentication has been detected, a second deposit debit information item is assigned to the second user account, wherein in the fifth method step, a second deposit credit assigned to the second deposit debit information item is assigned as a deposit credit to the second user account, and if it is established that the third station belongs to the group of setpoint stations, in addition to the second deposit credit, a first deposit credit, which is assigned to the deposit debit information item assigned to the first user account in the first method step, is also assigned to the second user account as a deposit credit.

22. A method for operating a system having Multiple stations according to claim 17 for providing the vehicle (20, 30) for use by a user, during which the user travels with the vehicle (20, 30) from a first station to a second station, the method comprising:

during which the vehicle (20, 30) is initially in a first parked state, in which it is held on a holder (1) of the first station in a set position relative to the first station and is prevented from being released from the holder (1) by a fixing device of the holder (1) and in which a battery of the vehicle (20, 30) is charged and during which, at the end, the vehicle (20, 30) is in a second parked state, in which it is held on a holder (1) of the second station in a set position relative to the second station and is prevented from being released from the holder (1) of the second station by a fixing device of the holder (1) and in which a battery of the vehicle (20, 30) is inductively charged.

23. The method according to claim 22, further comprising:

establishing access to a data memory for the creation of user accounts which in each case have a user identification information item as first account parameter and a vehicle operator information item as second account parameter, configuring a controller to allow the vehicle (20, 30) to be parked at one of the stations in a particular parked state, in which it is held on the holder (1) of this station in a set position relative to this station and is prevented from being released from the holder (1) by a fixing device of the holder (1) of this station and in which a battery of the vehicle (20, 30) is charged, only if an authentication of a user with such a created user account is detected.

24. The method according to claim 23, further comprising:

allowing parking of the vehicle (20, 30) in the particular parked state at a particular one of the stations only if an authentication of such a user with such a user account the second account parameter of which corresponds to a vehicle operator information item assigned to the particular station has been detected, and/or storing the number of authentications effected at the respective stations and in the case of every authentication, a vehicle identification information item for the vehicle (20, 30) held at the station is stored, and performing maintenance of the vehicle (20, 30) with this vehicle identification information item depending on the ascertained number.

\* \* \* \* \*